UNITED STATES PATENT OFFICE 2,657,997

STABILIZED CITRUS OIL AND METHOD OF PRODUCING THE SAME

Irving I. Rusoff, East Orange, and James Lincoln Common, Rutherford, N. J., assignors to General Foods Corporation, New York, N. Y., a corporation of Delaware No Drawing. Application July 16, 1951, Serial No. 237,058

20 Claims. (Cl. 99—150)

This invention relates to an improved flavoring material and to an improved gelatin product, and more particularly, to citrus oil flavoring materials and gelatin-flavor compositions which may be stored for long periods of time without undergoing the usual deleterious degradation reactions causing the development of undesirable off-flavors in the citrus oils and the development of gelatin insolubilization in the gelatin-flavor composition.

The oils extracted from citrus fruits, for example, orange, lemon, and lime oils are widely used to prepare flavoring materials for many products. In the past it has been found that citrus oils are highly susceptible to oxidative deterioration. The oil after it has been pressed from the fruit, if stored for 2 months at room temperature, will develop serious amounts of off-flavors which have been variously described as "terpy," "anise" and "loss of top." It is believed that these off-flavors are the result of the oxidative decomposition of terpenes, particularly limonene, into various aldehydes and ketones, limonene being a constituent of all the citrus oils. Upon the development of the aforementioned off-flavors, the citrus oil becomes unsuitable for use.

The industry has developed a method for quickly and accurately determining the usefulness of a citrus oil relative to the development of off-flavors. When an oxidizable oil or fat is exposed to oxygen or air under standardized conditions, a definite time interval termed the "induction period" elapses before there is an appreciable absorption of oxygen by the oil or fat, and the effectiveness of an antioxidant can be measured in terms of its ability to prolong the induction period. This measurement can be carried out conveniently with a Barcroft-Warburg apparatus in comparison with the control. The induction periods herein presented were obtained by the aforementioned method and apparatus the citrus oils being mechanically agitated in an atmosphere of oxygen at 90° C. Data obtained from this test can be accurately correlated to the anticipated storage characteristics of the oil under consideration. Generally, oil as it is freshly pressed from the citrus fruit will have an induction period of less than 5 hours, and a citrus oil having such an induction period and being used in a food product, for example, a gelatin dessert product, will develop unacceptable off-flavors within a maximum of 4 months.

Industry has long searched for an additive which would increase the induction period of the citrus oil flavoring materials. For example, ethyl hydrocaffeate, alpha tocopherol acetate, hydroquinone, benzyl parahydroxy benzoate, nordihydroguaiaretic acid, iso-thymol, citric acid, ascorbic acid, ethyl caffeate, propyl gallate, lecithin, sesamol, norconidendrin, alpha-naphthol, catechol, pyrogallol, wheat germ oil and various mixtures of the above have been tried. Of these substances like ethyl hydrocaffeate, alpha tocopherol acetate, nordihydroguaiaretic acid and lecithin increased the induction period to only about 12 hours. The best results which have been reported were found with using ethyl caffeate, which gave a maximum induction period of 30 hours at a 1.0% concentration. These results have not encouraged the citrus oil industry to consider using the aforementioned antioxidants in the citrus oils. To date, therefore, the citrus oils which are obtainable commercially are found to contain no antioxidants in spite of the minor improvements noted with the aforementioned additives.

We have now discovered that butylated hydroxyanisole when incorporated in a citrus oil will increase the induction period thereof to as long as 395 hours or more than 10 times the induction period of the best antioxidant presented in the prior art, ethyl caffeate. The amount of protection afforded to a citrus oil by butylated hydroxyanisole appears to vary directly with the amount of butylated hydroxyanisole used. For example, as little as 0.06% butylated hydroxyanisole added to freshly pressed lemon oil results in an induction period which increases from 3 hours without antioxidant to 40 hours with antioxidant. On the other hand, 0.5% butylated hydroxyanisole has increased the induction period of a freshly pressed lemon oil from 2.8 hours to the aforementioned 395. This latter figure is exceedingly remarkable and not all oil will be protected to such an extent; however, induction periods of over 300 hours are frequently obtained with citrus oils employing butylated hydroxyanisole. We have noted that the degree of protection not only depends on the amount of butylated hydroxyanisole added, but also many agricultural variables such as the degree of ripeness of the fruit, the geographical area in which the fruit was produced, the time of season when the fruit was harvested, etc. Thus, lemon oil freshly pressed from fruit harvested at a different time than the aforementioned examples resulted in an induction period which increased from 2.6 hours to 71 hours when 0.5% butylated hydroxyanisole was added to the citrus oil.

Citrus oils protected as described above are of value in all cases where the oil is to be consumed as a food. However, they are of particular value for use in the preparation of gelatin-flavor compositions. In this connection, we have discovered additional unexpected valuable results when the combination of citrus oil, gelatin and butylated hydroxyanisole is used.

Gelatin-flavor compositions are produced by numerous methods for use in lemon pie fillings, gelatin desserts, bakery products, and so forth. The process set forth in U. S. Patent 2,369,847 defines an excellent process for preparing a gelatin-fixed flavor composition. In this case volatile, water immiscible flavoring materials are emulsified in a gelatin solution. Thereafter, the solution is jelled and dried to about 9–11% moisture and ground. Each particle contains many tiny droplets of flavoring material which are encapsulated by the gelatin. The encapsulated flavor thus may be introduced into any product and in any amount desired. Gelatin-fixed flavor compositions are also prepared by what is known as the macro process. In this case, a product results which contains comparatively large amounts of flavor, surrounded by a tear-drop shaped gelatin envelope. This product is ordinarily used to introduce a large amount of flavor into a product that is ordinarily introduced by the process of the aforementioned patent. Additionally, flavor has been introduced into a gelatin solution and subsequently jelled without the improvements noted above in the described processes.

The food industry has long been troubled with the problem of preparing gelatin-fixed flavor compositions which even after short periods of storage would not exhibit insoluble gelatin and in many cases undesirable off-flavors. The formation of insoluble gelatin decreases the value of the product in all cases, and in many cases makes it totally unusable. In the case of gelatin desserts, the insoluble particles are visible and unsightly in the prepared dessert. In the case of flavor encapsulated by the macro process, which is frequently used in connection with lemon pie fillings, the insolubilization occurs to such an extent that the housewife is unable to burst the tear drop and allow the flavor to be dispersed throughout the pie filling. In the bakery industry fixed flavors are often used in the form of a gelatin slab, a specified amount of the slab containing a specified amount of flavor. Any variation in the availability of the flavor in the slab cannot be tolerated. Insolubilization results in non-uniform flavor availability even though the flavor may have been uniformly distributed in the first place. This same difficulty is noted when any gelatin-fixed flavor is used. In addition, the aforementioned insolubilization results in flavor localization which is highly undesirable to the consumer. The mechanism causing the gelatin to become insoluble is unknown, and various conflicting theories have been set forth as explanations therefor.

Products having the characteristics described above, namely, the development of insoluble gelatin and of undesirable off-flavors after relatively short periods of storage present many distribution problems. In order to deliver a satisfactory product, the shelf time thereof must be maintained at a minimum. Accordingly, a great deal of waste occurs, and a large expenditure of time is required in removing degraded gelatin products from the grocer's shelf after the maximum allowable shelf life has expired.

In the past many attempts have been made to increase the shelf life of gelatin-fixed flavors. To date, however, no one has been able to use the citrous oil flavors in a gelatin product and allow them to stand under ordinary storage conditions for over as little as 2 months, and, in practice, any gelatin-fixed flavor composition employing a citrus oil which is still on the grocer's shelf after such a period is destroyed.

We have now discovered that the development of insoluble gelatin in gelatin-fixed flavors can be effectively minimized by the addition of specified amounts of butylated hydroxyanisole to the gelatin-flavor mixture, consequently, greatly increasing the possible shelf life of such products.

We have discovered that in general the amount of protection afforded to a gelatin-fixed flavor product increases directly with the amount of butylated hydroxyanisole. In order to afford the necessary protection against gelatin insolubilization, the butylated hydroxyanisole must be available in the form of a solution. In a gelatin-flavor product of the type described, we prefer to use the citrus oil as the solute, the citrus oil flavors having a maximum solubility of about 1–2% butylated hydroxyanisole. The minimum amount of butylated hydroxyanisole which may be used is optional. We have found that as little as 0.02% butylated hydroxyanisole will effectively prevent gelatin insolubilization in a gelatin-fixed orange oil flavored product for over 4 months, while 0.1% will provide the same protection for over 12 months. As aforementioned, gelatin insolubilization and off-flavors appear in about 2 months when butylated hydroxyanisole is not used.

It is preferred to add butylated hydroxyanisole to the flavoring material prior to its incorporation into the gelatin. The same result, however, can be obtained by adding the butylated hydroxyanisole to the gelatin solution prior to the incorporation of the flavor.

When five-fold lime oil was fixed in gelatin without butylated hydroxyanisole and stored, insoluble gelatin appeared after 2 months, and the flavor had noticeably deteriorated but was still acceptable for use. On the other hand, when 0.5% butylated hydroxyanisole was added to the lime citrus oil prior to encapsulation, insolubilization of the gelatin did not occur for 13 months while the flavor remained good for the entire period. Upon increasing the amount of butylated hydroxyanisole to 1.5%, no insolubilization appeared for over 15 months, while the flavor was as fresh as it was when the sample was prepared. Like results were obtained with orange oil. When concentrated orange oil was fixed without butylated hydroxyanisole, insolubilization had developed and flavor had degraded to such an extent that the product was completely unacceptable within 2 months. As noted previously, if 0.02% butylated hydroxyanisole is added, neither insolubility nor off-flavors develop to an unacceptable degree for over 4 months. By further increasing the amount of butylated hydroxyanisole to 0.1%, the product remains acceptable for over 12 months. Finally, we have found that samples of gelatin-fixed orange oil containing 0.3% butylated hydroxyanisole have a perfectly fresh flavor and exhibit only a trace of insoluble gelatin after 17 months. It makes little difference whether or not the flavor to be protected is concentrated or single strength. For example, when freshly pressed, single strength lemon oil was fixed in gelatin without butylated hydroxyanisole, the product became completely unacceptable because of gelatin insolubilization and the development of off-flavors within about 4 months. On the other hand, such a product containing 0.5% of butylated hydroxyanisole exhibits no insolubilization after 15 months and the flavor retains its fresh characteristics for the same period.

The foregoing description sets forth the best methods that we have devised for employing the principles of the present invention; however, there are many variations of the examples given above which will be readily apparent to those skilled in the art without departing from the spirit of the invention, and reference should be had to the appended claims for a definition of the limits of the invention.

What is claimed is:

1. A citrus oil in which butylated hydroxyanisole has been dissolved.
2. A citrus oil in which from about 0.02% to about 2% butylated hydroxyanisole has been dissolved.
3. An orange oil in which about 0.3% butylated hydroxyanisole has been dissolved.
4. A lemon oil in which about 0.5% butylated hydroxyanisole has been dissolved.
5. A lime oil in which about 0.5% butylated hydroxyanisole has been dissolved.
6. A process for increasing the induction period of citrus oils which comprises dissolving butylated hydroxyanisole therein.
7. A process for increasing the induction period of citrus oils which comprises dissolving from about 0.02% to about 2% butylated hydroxyanisole therein.
8. A process for increasing the induction period of orange oil which comprises dissolving about 0.3% butylated hydroxyanisole therein.
9. A process for increasing the induction period of lemon oil which comprises dissolving about 0.5% butylated hydroxyanisole therein.
10. A process for increasing the induction period of lime oil which comprises dissolving about 0.5% butylated hydroxyanisole therein.
11. A gelatin product containing a citrus oil dispersed therein, said citrus oil having butylated hydroxyanisole dissolved therein.
12. A gelatin product containing a citrus oil dispersed therein, said citrus oil having from about 0.02% to about 2% butylated hydroxyanisole dissolved therein.
13. A gelatin product containing orange oil dispersed therein, said orange oil having about 0.3% butylated hydroxyanisole dissolved therein.
14. A gelatin product containing lemon oil dispersed therein, said lemon oil having about 0.5% butylated hydroxyanisole dissolved therein.
15. A gelatin product containing lime oil dispersed therein, said lime oil having about 0.5% butylated hydroxyanisole dissolved therein.
16. A process for stabilizing a gelatin-flavor product comprising dissolving butylated hydroxyanisole in a citrus oil and dispersing said citrus oil throughout the gelatin.
17. A process for stabilizing a gelatin-flavor product comprising dissolving from about 0.02% to 2% butylated hydroxyanisole in a citrus oil and dispersing said citrus oil throughout the gelatin.
18. A process for stabilizing a gelatin-flavor product comprising dissolving about 0.3% butylated hydroxyanisole in orange oil and dispersing said orange oil throughout the gelatin.
19. A process for stabilizing a gelatin-flavor product comprising dissolving about 0.5% butylated hydroxyanisole in lemon oil and dispersing said lemon oil throughout the gelatin.
20. A process for stabilizing a gelatin-flavor product comprising dissolving about 0.5% butylated hydroxyanisole in lime oil and dispersing said lime oil throughout the gelatin.

IRVING I. RUSOFF.
J. LINCOLN COMMON.

References Cited in the file of this patent

UNITED STATES PATENTS

| Number | Name | Date |
|---|---|---|
| 2,367,269 | Epstein et al. | Jan. 16, 1945 |
| 2,369,847 | Olsen et al. | Feb. 20, 1945 |

OTHER REFERENCES

"Studies on Antioxidants," Kraybill et al., Bulletin #2, April 1948, issued by The American Meat Institute Foundation.

"Butylated Hydroxyanisole as an Antioxidant for Animal Fats," Kraybill et al., reprinted from the Journal of the American Oil Chemists' Society, September 1949 issue, vol. XXVI, No. 9.